(12) United States Patent
Frankenberger et al.

(10) Patent No.: US 8,812,191 B2
(45) Date of Patent: Aug. 19, 2014

(54) CONTROL DEVICE FOR AN ADJUSTABLE CHASSIS SYSTEM

(75) Inventors: Wolfgang Frankenberger, Unterpleichfeld (DE); Stefan Rappelt, Sulzheim (DE); Toni Schuck, Steinfeld bei Lohr am Main (DE); Stefan Kissner, Hohenroth (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/615,835

(22) Filed: Sep. 14, 2012

(65) Prior Publication Data

US 2013/0297149 A1   Nov. 7, 2013

(30) Foreign Application Priority Data

Sep. 15, 2011   (DE) .......................... 10 2011 113 332

(51) Int. Cl.
*G06F 17/00*   (2006.01)
*B60G 17/019*  (2006.01)
*B60G 17/016*  (2006.01)

(52) U.S. Cl.
CPC ........ *B60G 17/01908* (2013.01); *B60G 17/016* (2013.01); *B60G 2400/1062* (2013.01); *B60G 2401/904* (2013.01)
USPC ................ 701/37; 701/29.8; 701/38; 701/48; 701/69; 701/70; 340/425.5

(58) Field of Classification Search
CPC ........... B60G 17/01908; B60G 17/016; B60G 2204/11; B60G 2400/052; B60G 2400/10; B60G 2400/1032; B60G 2401/904; B60G 2800/912; B60G 2400/1042; B60W 2420/905
USPC .................... 701/29.8, 37, 38, 48, 63, 69, 70; 340/425.5; 73/794

See application file for complete search history.

(56) References Cited

U.S. PATENT DOCUMENTS

| 4,462,648 | A  | * | 7/1984  | Fohl ................................. 439/15 |
| 4,528,547 | A  | * | 7/1985  | Rodney .......................... 340/439 |
| 6,026,338 | A  |   | 2/2000  | Borschert |
| 6,109,115 | A  | * | 8/2000  | Miyazaki ........................ 73/794 |
| 6,134,488 | A  | * | 10/2000 | Sasaki et al. ................. 701/32.8 |
| 6,211,777 | B1 | * | 4/2001  | Greenwood et al. .......... 340/436 |
| 6,568,665 | B2 | * | 5/2003  | Foerster et al. ............ 267/64.27 |
| 2002/0183962 | A1 | * | 12/2002 | Glaser et al. .................. 702/151 |
| 2004/0262085 | A1 | * | 12/2004 | Mueller ....................... 187/222 |

FOREIGN PATENT DOCUMENTS

| DE | 4427599  | 8/1995 |
| DE | 19539566 | 5/2000 |
| DE | 19950177 | 5/2000 |

* cited by examiner

*Primary Examiner* — Gertrude Arthur Jeanglaude
(74) *Attorney, Agent, or Firm* — Cozen O'Connor

(57) ABSTRACT

A control device for an adjustable chassis system includes a connection to at least one sensor arrangement which provides at least one vehicle condition parameter of a vehicle. The measured vehicle condition parameter is spatially related to a position outside of the control device. The sensor arrangement is arranged inside the control device and forms a virtual miniature measurement plane which is extrapolated to an actual measurement plane.

9 Claims, 2 Drawing Sheets

CONTROL DEVICE FOR AN ADJUSTABLE CHASSIS SYSTEM

BACKGROUND OF THE INVENTION

1. Field of the Invention

The present invention is directed to a control device for an adjustable chassis system.

2. Description of the Related Art

For proper operation of an adjustable chassis system, condition parameters of the vehicle are acquired by means of a sensor arrangement. If possible, the sensors are located in the same place as the quantity to be measured. This basic rule has the advantage that any negative influences on the signal quality are minimized.

For this reason, a decentralized arrangement of the sensors is described as particularly advantageous in DE 199 50 177 A1 and DE 44 27 559 A1, the entire disclosure thereof is incorporated herein by reference. However, it has been shown that arranging the sensors, e.g., acceleration sensors, within the vibration damper is more expensive because the packaging of the sensors is very laborious. The sensors must be protected against dirt, heat and moisture. In some cases, expenditure on protection exceeds the cost of a standard sensor.

DE 195 39 566 C1, the entire disclosure thereof is incorporated herein by reference, discloses a control device for a chassis system. The control device is supplied by an individual acceleration sensor with acceleration signals which are assigned to the movement axes of the vehicle by dividing a total acceleration signal into a plurality of signal components. This principle has not been successful in practice because the signal quality is inadequate.

It is an object of the present invention to minimize the set of problems associated with the sensor arrangement and sensor protection known from the prior art.

SUMMARY OF THE INVENTION

According to the present invention, this object is met in that the sensor arrangement is arranged inside the control device and forms a virtual miniature measurement plane which is extrapolated to an actual measurement plane.

The great advantage of the invention consists in that the sensor arrangement is arranged precisely at that location where it can be implemented particularly easily. The control device affords protection on the one hand, and the mounting location is generally located outside of highly loaded zones on the other hand. The wiring in the vehicle is reduced as are interfaces which were previously required.

The control device is mounted at a definite location in the vehicle. Consequently, coordinates by which the vehicle condition signals can easily be extrapolated can be determined from the geometric dimensions of the vehicle, e.g., the distances between adjustable vibration dampers and the control device.

In its simplest embodiment, the sensor arrangement provides an acceleration signal with respect to a longitudinal axis of the vehicle, a transverse axis of the vehicle and a vertical axis of the vehicle.

When the sensor arrangement occupies a distance from the positions relevant for the adjustment of the chassis system due to the arrangement inside the control device, the signal quantity also changes proportionally. Since the control device tends to be arranged in the vicinity of the center of gravity of the vehicle, the change leads to a reduction in signal strength. This reduction in signal strength could be compensated by using particularly high-quality, i.e., high-resolution, sensors. But the problem can be solved in a much simpler manner in that a rate of rotation signal is provided with respect to a longitudinal axis of the vehicle, a transverse axis of the vehicle and a vertical axis of the vehicle, and the rate of rotation signal can be entered in the calculation of the vehicle condition.

Another possibility for simplifying the sensor arrangement consists in that the acceleration signal for all three vehicle axes is provided by a single sensor. A virtual plane is also determined in that three vehicle axes are incorporated in a coordinate system of the sensor.

Also, in case of an expanded sensor arrangement which acquires rate of rotation signals, an optimization of installation space can be achieved in that the rate of rotation signal for all three vehicle axes is provided by a singe sensor.

In a further optimized embodiment, the acceleration signals and the rate of rotation signals are provided by a single sensor. This consolidation of structural component parts and functions results in a further miniaturization of the control device.

For a problem-free integration of the control device in a vehicle, it is advantageous when the control device can be mounted primarily based on installation space considerations. For this purpose, the control device has an algorithm which compensates for an angular position of the control device relative to the measurement plane. In this way, the control device can be mounted anywhere in the vehicle, and the virtual plane required for the operation of the chassis system is always identically oriented.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention will be described more fully with reference to the following description of the drawings in which.

DETAILED DESCRIPTION OF THE PRESENTLY PREFERRED EMBODIMENTS

Figure 1:
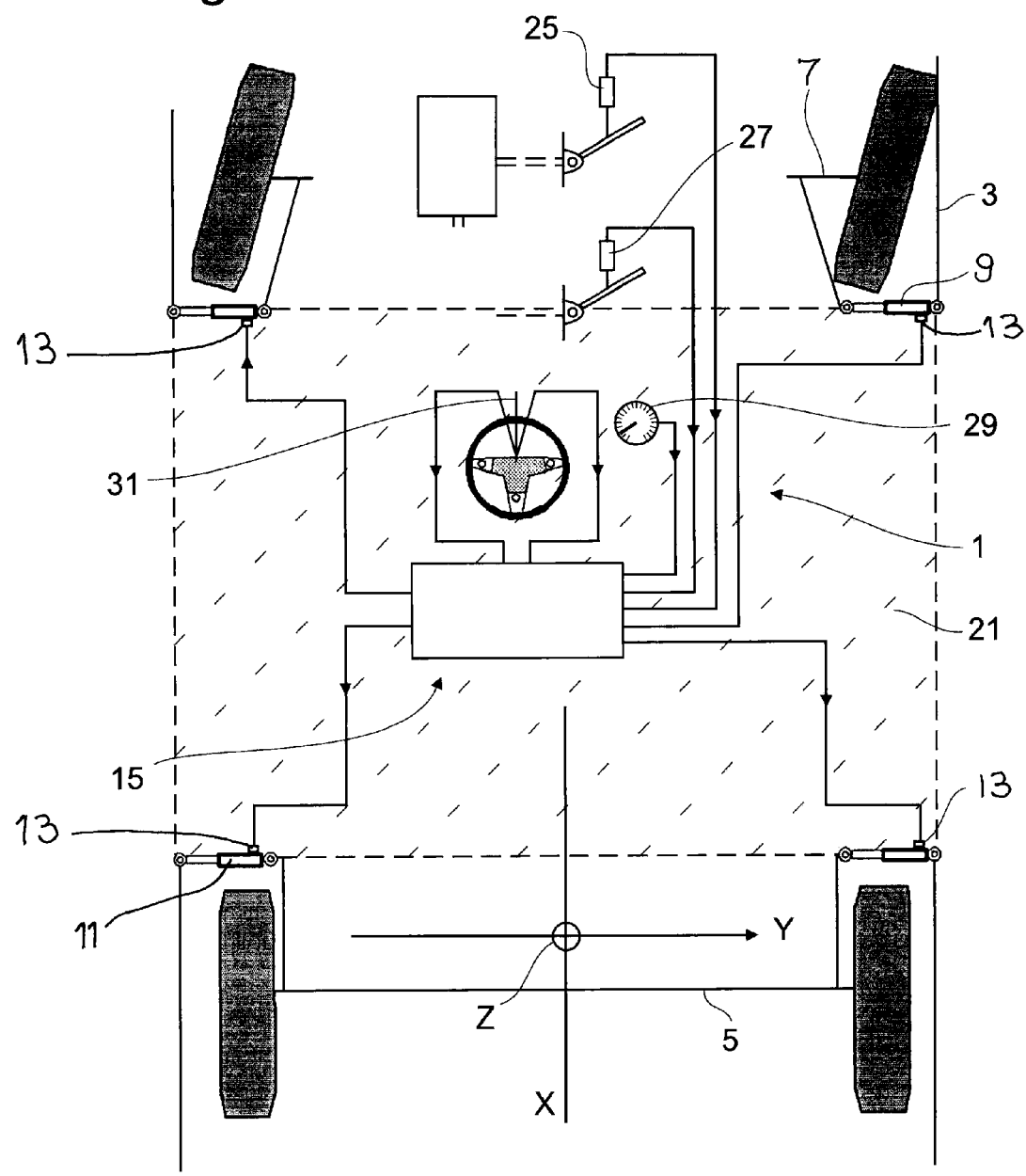
FIG. 1 is a schematic diagram of a vehicle.

FIG. 1 shows a schematic diagram of a chassis system 1 for a vehicle body 3. At least one axle 5, 7 of the chassis 1 is outfitted with vibration dampers 9, 11 which are adjustable with respect to damping force by means of at least one adjustable damping valve 13. Reference is had to DE 196 24 897 C2, for example, the disclosure of DE 196 24 897 C2 is hereby incorporated in its entirety. In principle, the invention can also be used in other adjustable chassis systems, e.g., an adjustable stabilizer.

The adjustable damping valves 13 are actuated by means of a control device 15. The damping valve is adjusted on the basis of a driving state which is detected by a sensor arrangement 17, FIG. 2. In its simplest embodiment, the sensor arrangement 17 provides an acceleration signal $a_i$ with respect to a vehicle's longitudinal axis X, transverse axis Y and vertical axis Z. The sensor arrangement is arranged inside the control device and forms a virtual miniature measurement plane 19 which is extrapolated to an actual measurement plane 21. A miniature measurement plane can be defined by means of three individual sensors because three points which are defined relative to one another in space describe a plane. The vehicle dimensions and the position of the control device 15 in the vehicle are known so that the extrapolation is possible by means of vector algebra.

Figure 3:
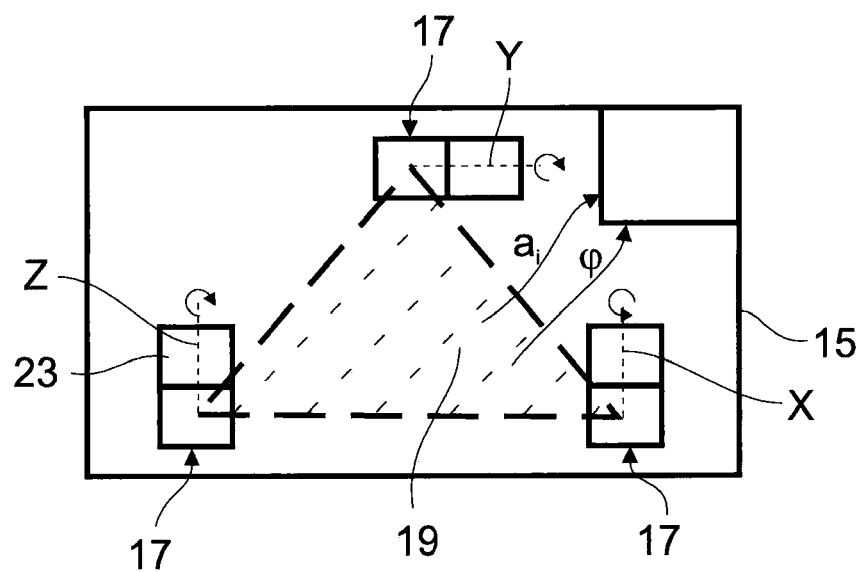
FIG. 3 is a schematic diagram of a control device with acceleration sensors and rate of rotation sensors according to the present invention.

According to FIG. 3, the sensor arrangement optionally comprises a rate of rotation sensor arrangement 23 which provides a rate of rotation signal with respect to a longitudinal axis of the vehicle, a transverse axis of the vehicle and a vertical axis of the vehicle. The rate of rotation signals $\phi$ are superimposed with the acceleration signals $a_i$. It may be that the control device 15 is arranged exactly in the center of gravity of the vehicle. In case of a pure rolling motion of the vehicle body around the longitudinal axis of the vehicle X, no vertical acceleration would occur considered in the ideal case. Consequently, the acceleration signal would represent an inaccurate description of the actual vehicle condition. However, the rate of rotation signal compensates for this deviation.

The acceleration signal for all three vehicle axes can also be provided by a single sensor. A sensor of this kind has three integrated measuring axes.

Also for the rate of rotation signal, there are individual sensors which provide a rate of rotation signal for all three vehicle axes.

A particularly compact design of the control device results when the acceleration signals and the rate of rotation signals are provided by a single sensor.

Figure 2:
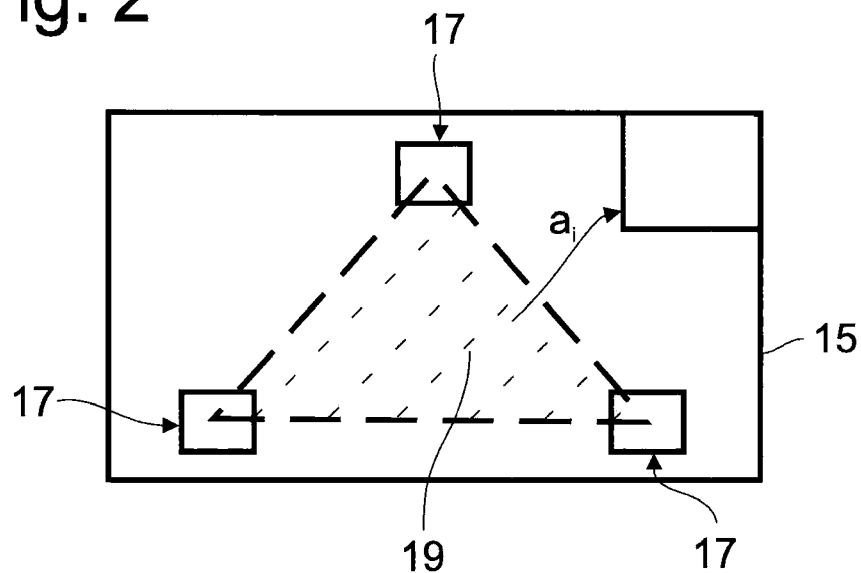
FIG. 2 is a simplified diagram of the sensor arrangement in the control device according to the present invention.

In FIGS. 1 to 3, the control device 15 is shown ideally related to the coordinate system of the vehicle. In reality, it happens very often that the control device 15 must be mounted obliquely in space with respect to the actual measurement plane 21 because the fastening points in the vehicle dictate this arrangement. To compensate for this angular position of the control device with respect to the measurement plane, the control device has an algorithm which is superimposed on the calculation of the measurement plane. The angular position is known in a vehicle-specific manner and the signals determined by the sensor arrangement can be corrected using known angle functions. The signals of the sensor arrangement 17, 23 are projected on the miniature measurement plane 19 in practice.

Regardless of the sensor arrangement 17, 23 in the control device 15, signals from other sensor devices prognosticating the vehicle condition, particularly the anticipated vehicle condition, can be used. These include, e.g., a sensor 25 for determining the accelerator pedal position, a brake pedal sensor 27, a tachometer 29 or a steering angle sensor 31.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A control device (15) for an adjustable chassis system (3) comprising:
   at least one sensor arrangement (17, 23) providing at least one vehicle body movement condition parameter of a vehicle, wherein the measured vehicle body movement condition parameter is spatially related to a position outside of the control device (15);
   a connection between said at least one sensor arrangement and said control device,
   wherein said sensor arrangement (17, 23) is arranged inside said control device (15) and forms a virtual miniature measurement plane (19) which is extrapolated to an actual measurement plane (21).

2. The control device according to claim 1, wherein said sensor arrangement (17) provides an acceleration signal with respect to a vehicle longitudinal axis (X), a vehicle transverse axis (Y) and a vehicle vertical axis (Z).

3. The control device according to claim 1, wherein said sensor arrangement comprises a rate of rotation sensor (23) for providing a rate of rotation signal ($\phi$) with respect to a vehicle longitudinal axis (X), a vehicle transverse axis (Y) and a vehicle vertical axis (Z).

4. The control device according to claim 2, wherein said acceleration signal for all three vehicle axes is provided by a single sensor.

5. The control device according to claim 3, wherein said rate of rotation signal for all three vehicle axes is provided by a single sensor.

6. The control device according to claim 1, wherein said acceleration signal and said rate of rotation signal are provided by a single sensor.

7. The control device according to at least one of claim 1, wherein said control device (15) further comprises an algorithm which compensates for an angular position of said control device (15) relative to the actual measurement plane (21).

8. The control device according to claim 3, wherein said sensor arrangement comprises a rate of rotation sensor (23) for providing a rate of rotation signal ($\phi$) with respect to a vehicle longitudinal axis (X), a vehicle transverse axis (Y) and a vehicle vertical axis (Z).

9. The control device according to claim 2, wherein said acceleration signal and said rate of rotation signal are provided by a single sensor.

* * * * *